United States Patent [19]

Yamamoto et al.

[11] Patent Number: 5,120,889
[45] Date of Patent: Jun. 9, 1992

[54] METHOD FOR MANUFACTURING BINDER FOR LEAD STORAGE BATTERY GLASS (FIBER) MATS

[75] Inventors: Toshinari Yamamoto, Kusatsu; Hisao Maruyama, Osaka, both of Japan

[73] Assignee: National Starch and Chemical Investment Holding Corporation, Wilmington, Del.

[21] Appl. No.: 450,776

[22] Filed: Dec. 14, 1989

[51] Int. Cl.⁵ .............................................. C08F 2/16
[52] U.S. Cl. ..................................... 524/460; 523/201
[58] Field of Search ........................ 523/201; 524/460

[56] References Cited

U.S. PATENT DOCUMENTS

| | | | |
|---|---|---|---|
| 4,226,752 | 10/1980 | Erickson et al. | 524/460 |
| 4,277,384 | 7/1981 | Arkens | 524/460 |
| 4,304,701 | 12/1981 | Das | 524/460 |
| 4,385,152 | 5/1983 | Boyack et al. | 524/460 |
| 4,427,836 | 1/1984 | Kowalski et al. | 524/460 X |
| 4,468,498 | 8/1984 | Kowalski et al. | 524/460 X |
| 4,654,397 | 3/1987 | Mueller-Mall et al. | 524/460 X |
| 4,814,373 | 3/1989 | Frankel et al. | 524/460 |
| 4,885,320 | 12/1989 | Biale | 524/460 X |
| 4,904,724 | 2/1990 | Auchter et al. | 524/460 X |
| 4,912,147 | 3/1990 | Pfoehler et al. | 524/460 |
| 4,914,142 | 4/1990 | Takarabe et al. | 524/460 |
| 4,973,621 | 11/1990 | Buter | 524/460 |
| 4,981,885 | 1/1991 | Engel et al. | 523/409 |

*Primary Examiner*—Joseph L. Schofer
*Assistant Examiner*—J. M. Reddick
*Attorney, Agent, or Firm*—Edwin M. Szala; Jane E. Gennaro

[57] ABSTRACT

A method for manufacturing binder for lead storage battery glass mats, characterized in that the ingredients (A) and (B) below are mixed and emulsion-polymerized:

(A) an aqueous dispersion obtained by mixing the following raw materials: (a) a thermo-crosslinking monomer and (b) an alkyl (meth)acrylate ester, as necessary ingredients, and emulsion-polymerizing them;

(B) a monomer mixture of a polymerizable unsaturated carboxylic acid (c) and the alkyl(meth)acrylate ester, as necessary ingredients.

4 Claims, 3 Drawing Sheets

METHOD FOR MANUFACTURING BINDER FOR LEAD STORAGE BATTERY GLASS (FIBER) MATS

BACKGROUND OF THE INVENTION

This invention concerns a method for manufacturing binder for lead storage battery glass mats.

In general, lead storage batteries, as shown in FIGS. 2 and 3, have $PbO_2$ anode plates 3 and Pb cathode plates 4 installed at a specific distance from each other and separators composed of superimposed glass papers 5 and glass mats 6 inserted between the aforementioned electrodes plates 3 and 4; the whole is immersed in an electrolyte solution consisting of an $H_2SO_4$ solution. 7 is a pole. This kind of glass mat 6 should be durable with respect to the electrolyte solution, in the first place, and it should also have a good permeability for the electrolyte solution and high mechanical strength. That is, in the process of assembling the lead storage battery, the separators with the glass mats 6 and the glass papers 5 superimposed on each other are driven in between the anodes 3 and the cathodes 4, and must have sufficient strength to withstand this driving operation and preserve the aformentioned electrodes; moreover, they should not be invaded by the electrolyte solution, and the electrolyte solution should be able to pass through them easily, from the point of view of producing electrical power. From these points of view, acrylate polymers, which have excellent acid resistance, are used as binders for binding the fiber structure of the aforementioned glass mats 6 and reinforcing them. In order to further increase the reinforcing effect of the aforementioned acrylate polymers, polymerizable unsaturated carboxylic acids such as acrylic acid or methacrylic acid and various kinds of thermo-crosslinking monomers can be copolymerized with them. For example, as such thermo-crosslinkable monomers, monomers with hydroxyl or glycidyl groups (Public Patent Bulletin No. 57-26546) or monomers with glycidyl or N-alkylol groups (Public Patent Disclosure Bulletin No. 61-288370), or organosilicon monomers (Public Patent Disclosure Bulletins Nos. 59-203738 and 61-155763) can be used. However, in acrylate copolymer binders in which these thermo-crosslinking binders are copolymerized, crosslinking reactions occur between the parts introduced from the thermo-crosslinking monomers and the parts introduced from the polymerizable unsaturated carboxylic acid, as time passes. If this phenomenon occurs before processing into the glass mat 6 is performed, there is the problem that the effect of reinforcing the glass mat 6 will be diminished.

The aforementioned lead storage battery glass mat binders require that the mechanical strength of the glass mats be reinforced, and also that the quantity of binder adhering to the glass mats be made small, so that the electrolyte solution will flow through them more easily. That is, in order to reduce the quantity adhering to the binder and produce a suitable mechanical strength, it is desirable for the binder to adhere uniformly not only to the surface of the glass mat but also inside it. From this point of view, the viscosity of the binder should be made high, and it has been proposed that the viscosity of the acrylic acid copolymer binder be raised by adding an alkali at the time it is used (Public Patent Bullentin No. 48-277093). However, even in such alkali-thickened binders, an acrylic acid copolymer, with a thermo-crosslinking monomer and a polymerizable unsaturated carboxylic acid copolymerized in, is used as the principal ingredient. In copolymers with such a structure, like the copolymers mentioned previously crosslinking reactions occur between the thermo-crosslinkable monomer parts and the carboxylic acid parts, and the ability to produce the viscosity obtained by thickening with an alkaline substance (abbreviated below as "alkali thickenability") and the property of tight adhesiveness to the glass fibers are greatly reduced over time. Consequently, in the aforementioned binders which use this principal ingredient, the aforementioned properties are also greatly reduced over time. Moreover, the proposal has also been made to incorporate organosilicon monomers with these binders and thus strengthen the adhesiveness with the glass fibers (Public Patent Disclosure Bulletin No. 59-203738). Although this binder has an increased adhesiveness to the glass fibers due to the aforementioned organosilicon monomers, the principal ingredient of the binder is an acrylic acid copolymer made by copolymerizing a thermo-crosslinking monomer and a polymerizable unsaturated carboxylic acid, and its alkali thickenability and adhesiveness to the glass fibers are still greatly reduced over time due to the occurrence of a crosslinking reaction. In order to correct this defect, a method has been proposed in which the reduction in the adhesiveness of the binder to the glass fibers over time is reversed by adding organosilicon compounds (Public Patent Disclosure Bulletin No. 61-288370). However, in this method, it is necessary to add the organosilicon monomer immediately before the binder is used, making the operation more complex, and in addition the reduction in alkali thickenability over time cannot be improved. Thus, up to now, glass mat binders have not existed which exhibit sufficient mechanical strength while reducing the quantity of binder adhering [to the glass mat], and the binder properties of which do not decrease over time.

This invention was made with these facts in mind. Its purpose is to provide a lead storage battery glass mat binder which exhibits sufficient mechanical strength even though the quantity adhering [to the glass mat] is small, and which does not suffer a decrease in its binder properties over time.

SUMMARY OF THE INVENTION

In order to accomplish the aforementioned problems, the method of manufacturing a lead storage battery glass mat binder of this invention is to mix the following ingredients (A) and (B) and emulsion-polymerize them.
- (A) an aqueous dispersion obtained by mixing the following raw materials: (a) a thermo-crosslinking monomer and (b) an alkyl (meth)acrylate ester, as necessary ingredients, and emulsion-polymerizing them;
- (B) a monomer mixture of a polymerizable unsaturated carboxylic acid (c) and the alkyl (meth)acrylate ester (b), as necessary ingredients.

1 . . . Shell part
2 . . . Core part

DETAILED DESCRIPTION

By making a two-layer structure, with the binder particles having a core part and a shell part, by two-stage polymerization, the thermo-crosslinking monomer part could be put into the core part, and the polymerizable unsaturated carboxylic acid part in the shell part surrounding it; in this way, the two parts would not touch each other during storage, and the crosslinking reaction would not occur. When the alkaline substance was added at the time the binder was used, dissociation of the carboxyl group in the polymerizable unsaturated carboxylic acid part, present in the shell part, would occur, and the thickening effect would be obtained. Moreover, the interface between the shell part and the core part would break during the stage of adhesion to the glass mat, and the polymerizable unsaturated carboxylic acid part of the shell part would contact the thermo-crosslinking monomer part of the core part, so that a crosslinking reaction of the two parts would occur, and sufficient mechanical strength would be imparted to the glass mat. In this way, this invention was accomplished.

Figure 1:
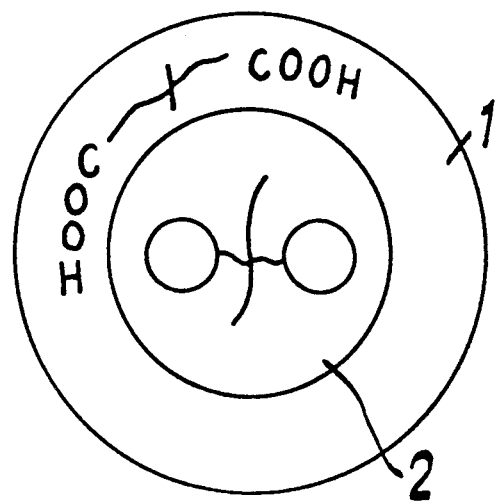
FIG. 1 shows a schematic diagram of the structure of the emulsion particles in the binder obtained in an actual example of this invention.
Figure 2:
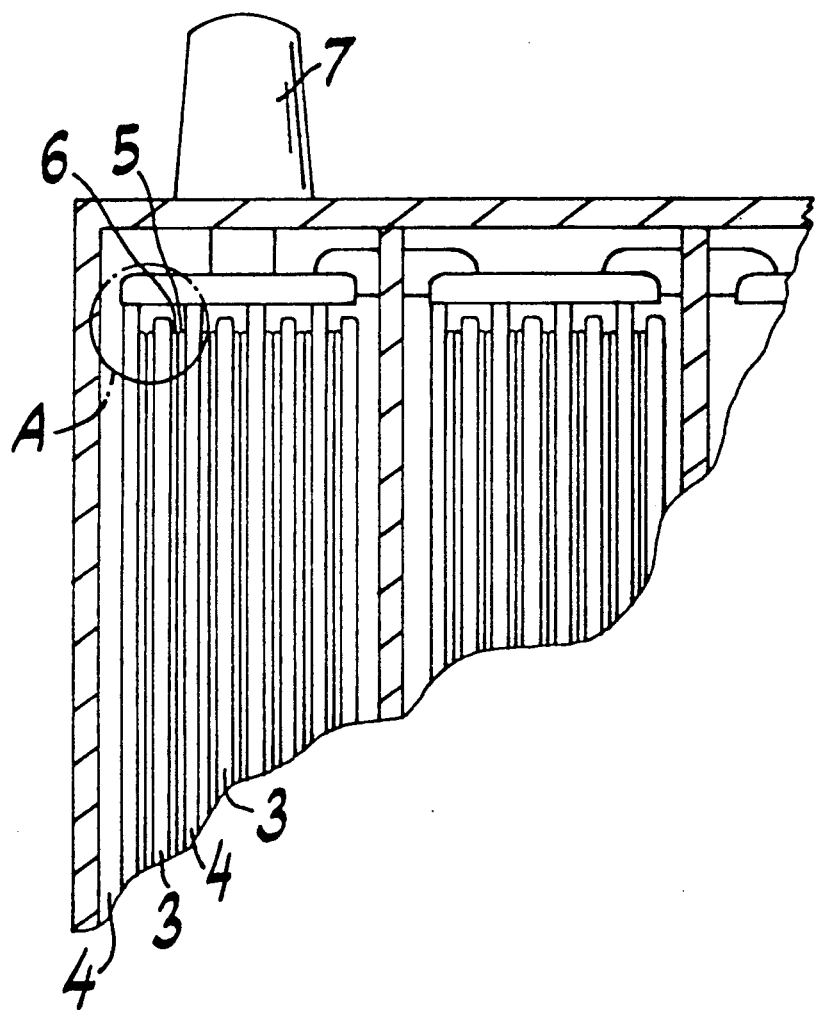
FIG. 2 shows a cross section of the structure of a lead storage battery.
Figure 3:
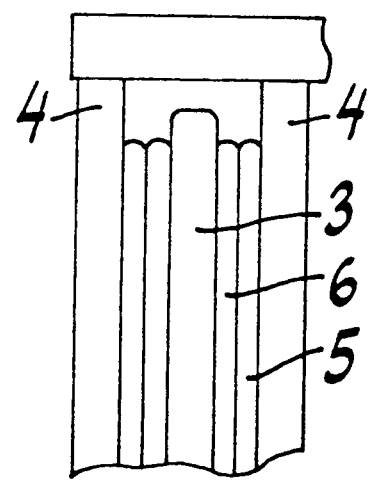
FIG. 3 is an enlarged diagram of part A, circled in FIG. 2.

The binder particles of this invention, as shown schematically in FIG. 1, consist of a core part 2, which is made of an alkyl acrylate ester polymer with a thermo-crosslinking monomer part, and a shell part 1, which is made of a copolymer of a polymerizable unsaturated carboxylic acid and an alkyl acrylate ester.

In this invention, as mentioned above, the binder containing the binder particles with the aforementioned structure is obtained by a two-stage polymerization. In the first-stage emulsion polymerization, a copolymer of the thermo-crosslinking monomer and the alkyl (meth)acrylate ester is formed; using this as the polymerization seed (the particle which forms the nucleus of an emulsion polymerization), the second-stage emulsion polymerization is performed. In this way, a shell is formed, consisting of the polymerizable unsaturated carboxylic acid and the alkyl (meth)acrylate ester, around the aforementioned polymerization seed particles. To explain this in further detail, this invention consists of the following: an ingredient (A), an aqueous dispersion containing the aforementioned polymerization seeds, obtained by the aforementioned first-stage emulsion polymerization, and an ingredient (B), a monomer mixture of the polymerizable unsaturated carboxylic acid used to perform the second-stage emulsion polymerization and an alkyl (meth)acrylate ester; these two ingredients are mixed and emulsion-polymerized.

The aqueous dispersion of ingredient (A) mentioned above uses a raw material mixture consisting of a thermo-crosslinking monomer (a) and an alkyl (meth)acrylate ester (b) as necessary ingredients, and is obtained by emulsion-polymerizing these ingredients.

As the aforementioned thermo-crosslinking monomer (a), one can use monomers with epoxy groups, such as glycidyl (meth)acrylate or allyl glycidyl, or monomers with hydroxyl groups, such as hydroxyl ethyl (meth)acrylate or hydroxypropyl (meth)acrylate. Moreover, as monomers with hydroxyl groups, one can also use monoesters or diesters of acrylic or methacrylic acid and polyethylene glycol, as well as diesters of acrylic or methacrylic acid and dihydric alcohols such as ethylene glycol or 1,3-butylene glycol. Moreover, besides the aforementioned monomers, one can also use monomers with N-alkylol groups such as N-methylol (meth)acrylamide or N-methoxymethyl (meth)acrylamide. Furthermore, one can also use monomers with hydrolyzable silyl groups such as vinyl trimethoxysilane, vinyl triethoxysilane, allyl ethoxysilane, γ-(meth)acryloxypropyl trimethoxysilane, γ-(meth)acryloxypropylmethyl dimethoxysilane, γ-(meth)acryloxypropyl tris(β-methoxyethoxy)silane, or 2-styrylethyl trimethoxysilane. The aforementioned monomers can be used individually or in combinations, as is suitable, for the thermo-crosslinking monomer (a).

The proportion of the aforementioned thermo-crosslinking monomer (a) in the raw material mixture (raw material of first-stage emulsion polymerization) should be in the range of 1–30 wt % (abbreviated below as "%"). If it is less than 1%, the effect of improving the binder coating strength by the crosslinking reaction will be insufficient, and the improvement in the mechanical strength of the glass mat will be insufficiently realized. On the other hand, if it is greater than 30%, tendencies for the emulsion polymerization to become unstable and for poor film-making of the binder to be produced will be seen.

As the alkyl (meth)acrylate ester (b) which is copolymerized with the aforementioned thermo-crosslinking monomer (a), esters of straight- or branched-chain aliphatic alkyl esters or alicyclic alkyl alcohols with carbon numbers of 1–8 and (meth)acrylic acid are ordinarily used. For example, methyl, ethyl, butyl, 2-ethylhexyl, stearyl, or cyclohexyl esters of acrylic acid or methacrylic acid may be used. These esters may be used individually or in combination. The proportion of this ester (b) in the raw material mixture should be 30–99%. If it is less than 30%, a tendency for the water resistance and acid resistance of the binder to be insufficient will be seen.

The aforementioned raw material mixture has as necessary ingredients the thermo-crosslinking monomer (a) and the alkyl (meth)acrylate ester (b); in some case, another polymerizable monomer (d) may also be included as an optional ingredient. The quantity of this monomer (d) used should be such that it accounts for 0–69% of the aforementioned raw material mixture. As the other polymerizable monomer (d), one can use publicly-known monomers which can be copolymerized with the aforementioned (a) and (b), especially styrene. However, besides styrene, one can also use vinyl acetate, acrylonitrile, vinyl chloride, vinylidene chloride, vinyl fluoride, vinylidene fluoride, ethylene, propylene, butadiene, isoprene, divinylbenzene, or diallyl phthalate, etc. These compounds may be used individually or in combination. Furthermore, it is also possible to include the polymerizable unsaturated carboxylic acid (c) as an optional ingredient of the aforementioned raw material mixture, as long as only a small quantity of it is used (about 0.1–4% of the aforementioned raw material mixture).

The aqueous dispersion of the aforementioned ingredient (A) is obtained by emulsion-polymerizing the aforementioned raw material mixture of ingredients (a), (b), and, if desired, (d). The methods by which this emulsion polymerization may be performed are not especially limited; any publicly-known method may be used. In this way, an alkyl acrylate ester copolymer with the aforementioned ingredients (a), (b), and (d) as copolymer ingredients is obtained; this becomes the polymerization seed for the second-stage emulsion polymerization.

The monomer mixture of ingredient (B), which is emulsion-polymerized with the aforementioned aqueous dispersion of ingredient (A), has as its necessary ingredients a polymerizable unsaturated carboxylic acid (c) and an alkyl (meth)acrylate ester (b).

As the aforementioned polymerizable unsaturated carboxylic acid (c), ones with one or more carboxyl groups per molecule are used: for example, unsaturated monobasic acids such as acrylic acid, methacrylic acid, or crotonic acid, or unsaturated dibasic acids such as maleic acid, fumaric acid, or itaconic acid may be used. Furthermore, one may also use monoester compounds of alkyl alcohols with carbon numbers of 1–17 and unsaturated dibasic acids, or monoester compounds of monoesters of dihydric alcohols and lower monohydric alcohols and unsaturated dibasic acids, etc. can be used. These compounds can be used individually or in combination.

The aforementioned polymerizable unsaturated carboxylic acid (c) should be used in the proportion of 5–35% of the aforementioned monomer mixture of ingredient (B). If it is less than 5%, the alkali thickenability, which affects the quantity of binder which adheres and the migration prevention, and the adhesiveness of the binder to the glass fibers, will be insufficient, and a tendency will be seen for the effect of improving the mechanical strength of the glass mat to be insufficient. Conversely, if it is greater than 35%, the water resistance and acid resistance of the binder will be insufficient, and the emulsion polymerization will become unstable.

The alkyl (meth)acrylate ester (b) used together with the aforementioned polymerizable unsaturated carboxylic acid (c) is one of the ones which were used in the aforementioned aqueous dispersion of ingredient (A). In this case, the ester used in ingredient (B) may be the same as the one used in ingredient (A) or a different one.

This alkyl (meth)acrylate ester (b) should be used in a proportion of 30–95% of the monomer mixture. If it is less than 30%, tendencies will be seen for the water resistance and acid resistance of the binder to become poor, and for the adhesiveness of the binder to the glass fibers to become poor.

The aforementioned polymerizable unsaturated carboxylic acid (c) and the alkyl (meth)acrylate ester (b) are the necessary ingredients of the monomer mixture of ingredient (B), but in some cases another polymerizable monomer (d) may also be used as an optional ingredient. This other polymerizable monomer (d) is one of the ones which were used in the aforementioned aqueous dispersion ingredient (A); it may be the same as the one used in ingredient (A) or a different one.

If the total quantity of the aforementioned ingredients (c), (b), and (d) of this monomer mixture [ingredient (B)] is considered as 100%, the quantity of the other polymerizable monomer (d) which is used if desired should be in the range of 0–65%. If it is greater than 65%, the water resistance and acid resistance of the binder will be poor, and the adhesiveness to the glass fibers will be poor.

In this invention, the aforementioned aqueous dispersion of ingredient (A) and the monomer mixture of ingredient (B) are mixed and emulsion-polymerized. In this case, the proportions of the aqueous dispersion (A) and the monomer mixture (B) used should be such that the solid components of the thermo-crosslinking monomer (a), the alkyl (meth)acrylate ester (b), and the other polymerizable monomer (d) in the aforementioned aqueous dispersion (A) should be in the range of 30–70% of the total monomers [i.e., the total monomers in the aforementioned ingredients (A) and (B)]. If it is less than 30%, the effect of increasing the binder film strength due to the copolymer of the thermo-crosslinking monomer (a), the alkyl (meth)acrylate ester (b), and the other monomer (d) will become small, and a tendency for the mechanical strength of the glass mat to become insufficient will be seen. Conversely, if it is greater than 70%, the quantity of the monomer mixture of ingredients (B) will become relatively smaller, and a tendency will be seen for the glass fiber adhesiveness due to the monomer mixture to become insufficient will be seen.

Furthermore, in the emulsion polymerization of the aforementioned aqueous dispersion ingredient (A) and the monomer mixture ingredient (B), the monomer mixture ingredient (B) may be added to the aqueous dispersion ingredient (A) all at once, or it may be added in portions. It may also be added continuously. In this case, a multi-stage polymerization method may be employed, in which the aforementioned aqueous dispersion ingredient (A) and the monomer mixture ingredient (B) are each divided into two or more groups, but from the points of view of simplifying the manufacturing process and shortening the required time, it is preferable to polymerize them in one stage each.

As the emulsifiers used in the aforementioned second-stage emulsion polymerization and the previously-mentioned first-stage emulsion polymerization, one can use conventional publicly-known anionic, cationic, or non-ionic emulsifiers. For example, one can use sodium dodecyl sulfate, ammonium dodecyl sulfate, sodium dodecyl polyglycol ether sulfate, and alkali metal salts or ammonium salts of sulfonated paraffin, sodium dodecyl benzene sulfonate, sodium laurate, higher alkyl naphthalene sulfonic acid salts, dialkyl sulfosuccinic acid salts, polyoxyethylene alkyl sulfonates, polyoxyethylene alkyl aryl sulfonates, sorbitan fatty acid esters, polyoxyethylene sorbitan fatty acid esters, polyoxypropylene polymers, lauryltrimethyl ammonium chloride, alkyl benzylmethyl ammonium chloride, polyvinyl alcohol, poly[sodium(meth)acrylate], poly[ammonium(meth)acrylate], or poly[hydroxyethyl(meth)acrylate], etc. These compounds can be used individually or in combination. If the quantity of emulsifier used is too large, there will be a tendency for the water resistance of the binder to be inferior; therefore, the quantity used should be 10% or less, preferably 5% or less, of the aqueous dispersion (A) and the monomer mixture (B), individually.

As the polymerization medium used in the aforementioned emulsion polymerizations, one can use those which are ordinarily used in emulsion polymerizations, e.g., ammonium persulfate, calcium persulfate, sodium persulfate, hydrogen peroxide, benzoyl peroxide, dicumyl peroxide, di-t-butyl peroxide, 2,2'-azobisisobutyronitrile, etc. The quantities used should be in the range of 0.01–3% of the raw material mixture and monomer mixture. Moreover, when it is necessary to increase the polymerization speed or reduce the reaction temperature, one may perform the polymerization in a redox system using a combination of a peroxide and an ascorbate, a soluble sulfite, or a hydrosulfite thiosulfate, etc. The polymerization temperature should be 30°–90° C.

By performing the emulsion polymerizations in this way, a binder with a double-layer binder particle structure, as shown in FIG. 1, is obtained.

Since the particles of this binder have the aforementioned double-layer structure, i.e., a core-shell structure, the stability of the binder when left standing is increased, and even after it has been stored for a long time, a certain viscosity is always obtained when it is thickened with an alkaline substance. Consequently, the phenomenon of a decreased adhesiveness between the binder and the glass fibers over time is not caused. Ordinarily, it is desirable to add an alkaline substance to make the pH 5 or more. As the alkaline substance, ones which exhibit [their actions] during the drying process when the glass mat is manufactured are preferable from the point of view of their not remaining in the glass mat and decreasing its water resistance and acid resistance: for example, one may use ammonia, methylamine, ethylamine, diethylamine, triethylamine, ethanolamine, triethanolamine, etc. Moreover, with the binder of this invention, since the crosslinking phenomenon is produced and a three-dimensional reticular structure is assumed after the adhesion to the glass mat, the handling ability during storage is excellent (low viscosity, etc.), and sufficient mechanical strength can be imparted to the glass mat with the adhesion of a small amount of binder.

Furthermore, publicly-known viscosity-regulating agents, coupling agents, cross-linking agents, etc., can also be added to the binders for storage battery glass mats which are obtained as described above.

With the method of manufacturing binders for lead storage battery glass mats of this invention, one can easily obtain binders which do not have reduced alkaline thickenability, which affects the quantity of binder adhering and the prevention of migration, and reduced adhesiveness to the glass fibers over time. Moreover, the binder obtained has excellent stability over time, and can impart consistently high mechanical strength to the glass mat. Consequently, the glass mats treated with this binder will have sufficient strength to withstand a strong beating force during the manufacturing of the lead storage battery. In addition to this, by regulating the quantity of alkaline substance used, the viscosity can be regulated; hence, one can easily regulate the viscosity so that a uniform adhesion can be obtained, and thus sufficient mechanical strength can be obtained with the smallest quantity of binder used.

Next, this invention will be explained with the aid of actual examples.

EXAMPLE 1

An aqueous dispersion [ingredient (A)] with a concentration of 28% was prepared by emulsion-polymerizing 21.5 parts by weight (abbreviated below as "parts") styrene, 19.5 parts methyl acrylate, and 2 parts N-methylol acrylamide. Next, 194 parts of this aqueous dispersion was charged into a reactor provided with a stirrer, and the atmosphere inside the reactor was replaced with nitrogen, after which 0.16 parts potassium persulfate were charged into the reactor. The reactor was heated to 75° C. while blowing nitrogen gas into it, to produce a homogeneous aqueous solution. Next, a monomer mixture [ingredient (B)] composed of 25.8 parts methyl methacrylate, 17.5 parts methyl acrylate, 6.5 parts methacrylic acid, and 1.5 parts sodium nonyl phenyl polyoxyethylenesulfonate, which had been prepared beforehand, was dropped into this aqueous solution through a dropping funnel for 2 hours. After this dropping was completed, the temperature was kept at 75° C. and the stirring was continued for 2 hours to perform an emulsion polymerization. After this, the reactor was cooled to 30° C. Then, the pH was adjusted to 6.5 by adding 1% ammonia water. A binder for lead storage battery glass mats consisting of an aqueous dispersion with a nonvolatile component of 33.5% was obtained. This binder was denoted as binder (1).

EXAMPLES 2-5

The same operations were performed as in Actual Example 1, except that the monomer mixture composition, emulsifier, polymerization medium, polymerization temperature, and water were as shown in Table 1, to obtain binders (2)-(5).

TABLE 1

| | Actual Example 2 | | Actual Example 3 | | Actual Example 4 | | Actual Example 5 | |
|---|---|---|---|---|---|---|---|---|
| | Binder No. | | | | | | | |
| | Binder (2) | | Binder (3) | | Binder (4) | | Binder (5) | |
| Raw material mixture in ingredient A (parts) | MMA | 27.3 | St | 27.5 | MMA | 28.2 | MMA | 27.5 |
| | BA | 18.7 | MA | 19.0 | MA | 19.3 | MA | 19.0 |
| | HEMA | 3.0 | N-MAM | 2.0 | N-MAM | 2.0 | GMA | 0.5 |
| | γ-methacryl-oxypropyl methoxysilane | 1.0 | HEMA | 1.5 | GMA | 0.5 | HEMA | 2.0 |
| | — | | — | | — | | γ-methacryl-oxypropyl methoxysilane | 1.0 |
| Monomer mixture (ingredient B) (parts) | MMA | 25.8 | St | 21.5 | MMA | 26.4 | MMA | 25.8 |
| | MA | 17.7 | MA | 15.0 | MA | 18.1 | MA | 17.7 |
| | MAA | 6.5 | MAA | 13.8 | AA | 5.5 | MAA | 6.5 |
| Polymerization temperature (°C.) | 70 | | 80 | | 70 | | 65 | |
| pH | 6.6 | | 6.3 | | 5.8 | | 6.0 | |
| Nonvolatile | 33.1 | | 33.7 | | 33.2 | | 32.6 | |

TABLE 1-continued

|  | Actual Example 2 | Actual Example 3 | Actual Example 4 | Actual Example 5 |
|---|---|---|---|---|
|  |  | Binder No |  |  |
|  | Binder (2) | Binder (3) | Binder (4) | Binder (5) |
| component (%) |  |  |  |  |

(Note)
MMA: methyl methacrylate
BA: butyl acrylate
HEMA: hydroxyethyl methacrylate
MA: methyl acrylate
MAA: methacrylic acid
St: styrene
N-MANN: N-methylol acrylamide
GMA: glycidyl methacrylate
AA: acrylic acid

COMPARISON EXAMPLE 152 parts water, 1 part sodium nonylphenyl polyoxyethylene sulfonate, and 0.3 part sodium persulfate were charged into the same reactor used in Actual Example 1, and the reactor was heated to 75° C. while blowing nitrogen gas into it, making a homogeneous aqueous solution. Next, a previously-prepared monomer mixture consisting of 54 parts methacrylic acid, 26 parts butyl acrylate, 1 part glycidyl methacrylate, 3 parts N-methylol acrylamide, 16 parts methacrylic acid, and 4 parts sodium nonylphenyl polyoxyethylene sulfonate was dropped in for 4 hours from a dropping funnel. After this, the temperature was lowered to 75° C. and stirring was continued for 2 hours to perform an emulsion polymerization, after which the temperature was lowered to 30° C. Then, the pH was adjusted to 6.5 by adding 1% ammonia water, and an aqueous dispersion with a nonvolatile component of 32.5% was obtained. In this aqueous dispersion, the binder particles had homogeneous structures. This was designated as the comparison binder.

The binders obtained in Examples 1-5 and the Comparison Example were subjected to the following function tests. The results are shown in Table 2 below.

Alkaline thickenability and stability over time

The sample, heated and accelerated for a specific time in a 50° C. atmosphere, was diluted to a solid component of 7%, and its pH was then adjusted to approximately 9.5 with 25% ammonia water. Its viscosity was measured after 20 hours.

Glass paper strength test

The aforementioned binder, after it was alkali-thickened, was diluted to a solids content of 2% and impregnated into commercial glass paper (78 g/m²; glass fiber length 800μ), and adjusted to the prescribed adhesion quantity, after which it was dried for 15 minutes at 105° C.; a glass paper with an adhesion quantity of 13% was obtained.

Test pieces 100 mm by 15 mm made from this glass paper were pulled in the longitudinal direction, and their strengths were measured.

TABLE 2

| Binder No. | Immediately after manufacturing of binder | | 3 months after manufacturing | |
|---|---|---|---|---|
|  | Alkali thickenability (cps) | Glass paper strength test (kg/15 mm) | Alkali thickenability (cps) | Glass paper strength test (kg/15 mm) |
| Binder (1) | 400 | 2.10 | 390 | 2.10 |
| Binder (2) | 115 | 2.00 | 105 | 2.05 |
| Binder (3) | 300 | 1.65 | 300 | 1.70 |
| Binder (4) | 120 | 2.00 | 100 | 1.90 |
| Binder (5) | 120 | 2.05 | 105 | 2.00 |
| Comparison binder | 135 | 1.90 | 13 | 1.35 |

As is clear from the table above, binders 1-5 obtained in the actual examples had excellent results in alkali thickenability and in the glass paper strength test from immediately after the manufacturing of the binder to 3 months after the manufacture, compared to the binder of the Comparison Example.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

What is claimed:

1. A sequential emulsion polymerization process for making an emulsion polymer for use as a binder for lead storage battery glass mats comprising the steps of
    (A) forming a first stage emulsion polymer in an aqueous medium containing a free radical initiator by emulsion polymerizing
        (a) a thermo-crosslinking monomer selected from the group consisting of monomers containing epoxy groups, monomers containing hydroxyl groups, monomers containing N-alkylol groups, and monomers containing hydrolyzable silyl groups, or mixtures of these monomers, present in an amount from 1% to 30% by weight of the first stage polymer, and
        (b) an acrylate ester selected from the group consisting of $C_1$-$C_{18}$ alkyl acrylates and alkyl methacrylates, or mixtures of these esters, present in an amount from 30% to 99% by weight of the first stage polymer; and
    (B) forming a monomer mixture comprising
        (b) an acrylate ester selected from the group consisting of $C_1$-$C_{18}$ alkyl acrylates and alkyl methacrylates, or mixtures of these esters, present in an amount from 30% to 95% by weight of the monomer mixture, and (c) a polymerizable unsaturated carboxylic acid selected from the group consisting of carboxylic acids having one or more carboxyl groups per molecule, monoesters of $C_1$-$C_{17}$ alkyl alcohols and unsaturated dibasic acids, and monoesters of dihydric alcohols and lower monohydric alcohols and unsaturated dibasic acids, or mixtures of those acids, present in an amount of 5% to 35% by weight of the monomer mixture; and (C) emulsion polymerizing the first stage polymer from step (A) with the monomer mixture from step (B).

2. The process according to claim 1 in which the first stage polymer formed in step (A) further comprises a mono- or polyethylenically unsaturated monomer present in an amount up to 69% of the first stage polymer.

3. The process according to claim 1 in which the monomer mixture of step (B) further comprises a mono- or polyethylenically unsaturated monomer present in an amount up to 65% of the monomer mixture.

4. The process according to claim 1 in which the solids content of the first stage polymer formed in step (A) comprises 30% to 70% by weight of the solids content of the emulsion polymer formed in step (C).

* * * * *